March 12, 1940.   M. J. WEINBERG   2,193,013
PROCESS AND APPARATUS FOR FORMING BUTTER CHIPS
Filed March 14, 1939   3 Sheets-Sheet 1
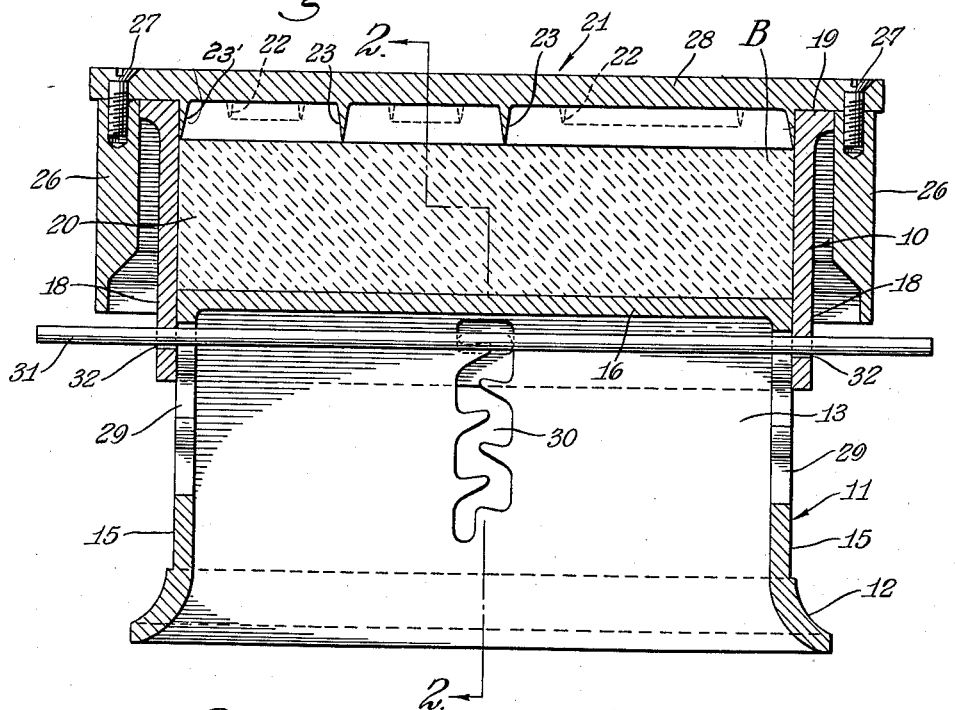
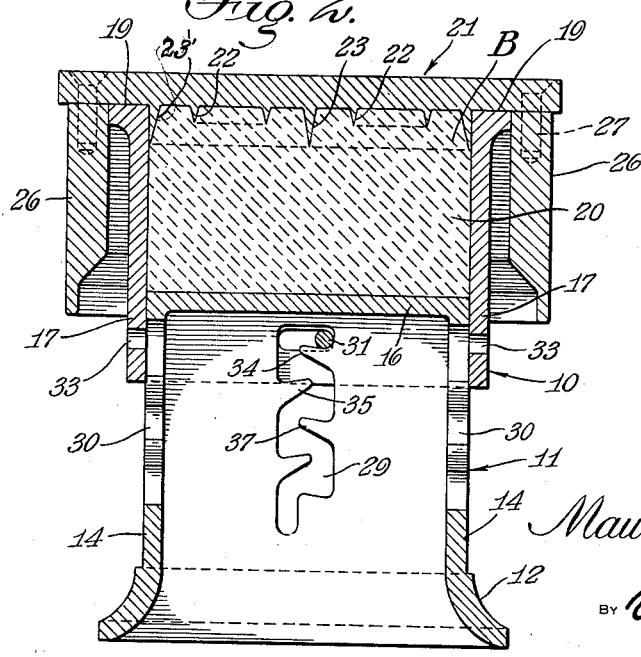
Maurice J. Weinberg
INVENTOR
BY Victor J. Evans & Co.
ATTORNEYS March 12, 1940.                M. J. WEINBERG                2,193,013
                PROCESS AND APPARATUS FOR FORMING BUTTER CHIPS
                      Filed March 14, 1939          3 Sheets-Sheet 2
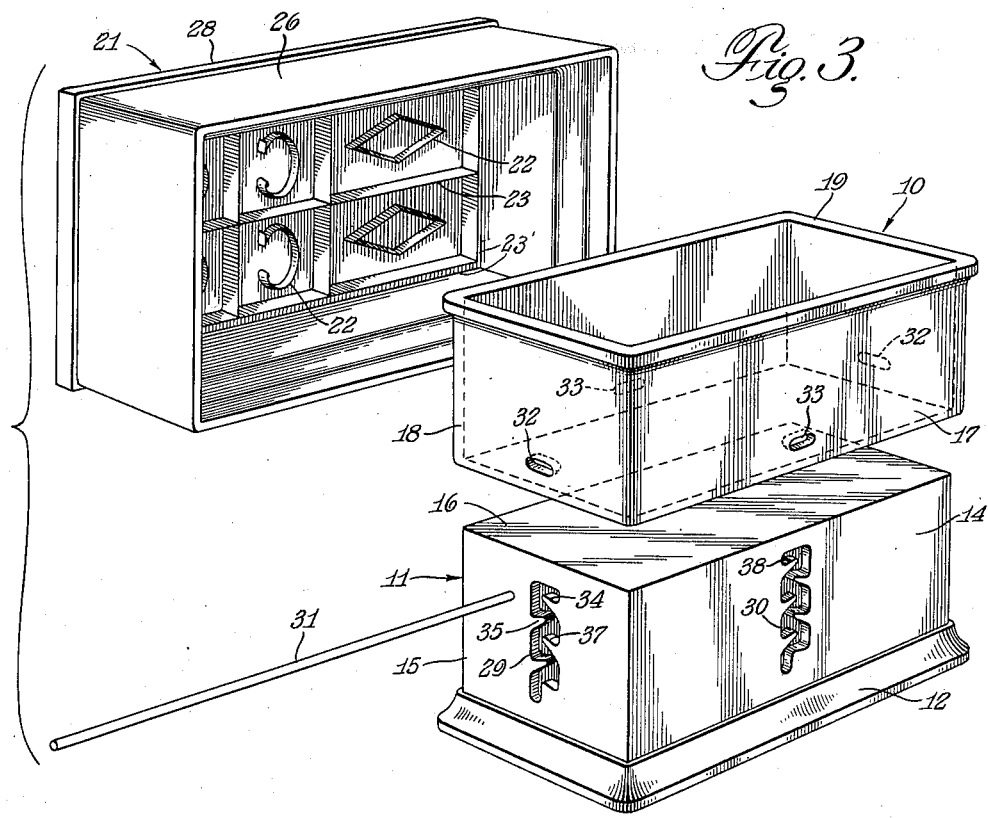
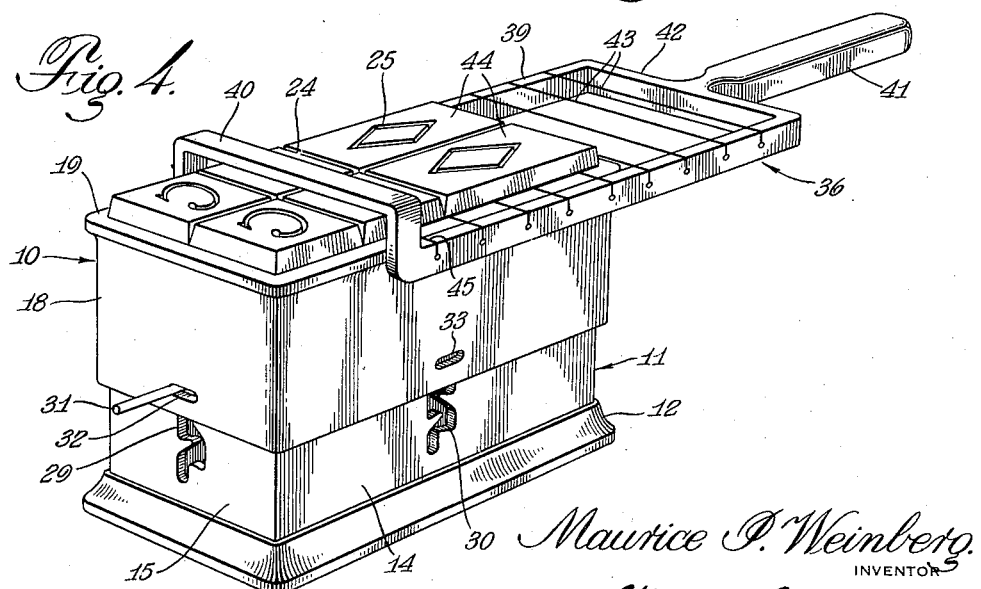

March 12, 1940. M. J. WEINBERG 2,193,013
PROCESS AND APPARATUS FOR FORMING BUTTER CHIPS
Filed March 14, 1939 3 Sheets-Sheet 3
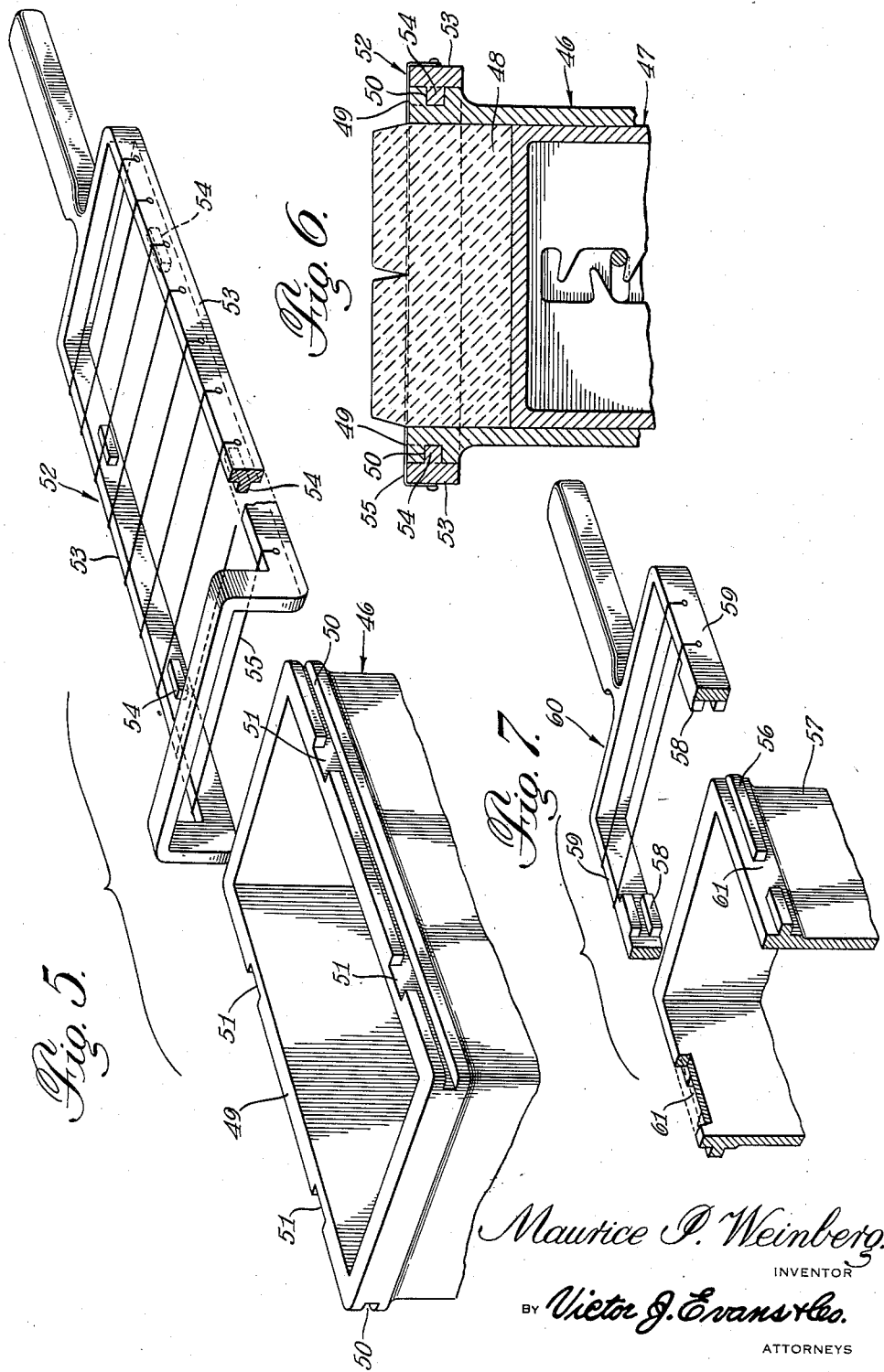
Maurice J. Weinberg.
INVENTOR
BY Victor J. Evans & Co.
ATTORNEYS Patented Mar. 12, 1940

2,193,013

UNITED STATES PATENT OFFICE 2,193,013

PROCESS AND APPARATUS FOR FORMING BUTTER CHIPS

Maurice J. Weinberg, New York, N. Y.

Application March 14, 1939, Serial No. 261,839

12 Claims. (Cl. 31—7)

The present invention relates to a new and improved process and apparatus for forming butter chips or patties.

An important object of the invention is to provide a device that will produce butter in chip form and simultaneously ornament and/or emboss each formed chip.

A further object is to provide a device of this character that will readily convert butter from print or bulk form, into ornamented chips or patties, and including means for removing the ornamented patties from the ornamenting and forming device.

A still further object of the invention is the provision of a butter chip forming and ornamenting device containing means for confining butter in bulk form, with an impresser for ornamenting one surface thereof and for simultaneously therewith forming longitudinal and transverse cuts across said ornamented surface, with additional means for projecting the butter above the confining means whereby the ornamented surface can be removed and, by repeating the operation, form in successive operations a multiplicity of similar patties from a single print of butter.

A further object of the invention resides in the provision of a butter chip maker having the above characteristics in which means is provided in conjunction with the butter supporting chamber for efficiently and effectively removing the formed and ornamented patties.

Briefly and broadly described, the present invention provides a pair of frame members movable relative to each other, one of said frames forming with the upper portion of the other frame a receiving chamber for butter in print or bulk form, the closure for said chamber embodying means for ornamenting one surface of the print of butter and simultaneously therewith forming longitudinal and transverse cuts across said print. Specially devised means are provided whereby one of said frames is moved a predetermined distance relative to the other of said frames to expose or project the ornamented surface above the butter receiving chamber whereby the ornamented and cut surface can be removed. By repeating the above operation, the entire print of butter is transformed into chips of equal size with a minimum amount of time and effort.

The invention will be fully and comprehensively understood from a consideration of the following detailed description when read in connection with the accompanying drawings which form a part of the application.

In the drawings:

Figure 1 is a transverse sectional view of the device and illustrating a print of butter in the process of ornamenting and chip making.

Figure 2 is a vertical sectional view taken substantially on line 2—2 of Figure 1.

Figure 3 is an exploded perspective view of the several parts forming the invention.

Figure 4 is a perspective view illustrating the step of removing ornamented chips from the print of butter.

Figure 5 is an exploded perspective view of a modified form of the invention.

Figure 6 is a vertical sectional view illustrating the use of the device shown in Figure 5, and Figure 7 is a fragmentary exploded perspective view of a still further modified form of the device.

While the herein described device is applicable for household use, it is primarily adapted for use by hotels, restaurants and the like wherein it is common practice to serve butter in chip or patty form. At the present time devices for forming ornamented butter chips and patties in wholesale quantities are exceedingly complicated and, therefore, very expensive to obtain with the result that most establishments resort to crude methods of serving butter in chip form and without any ornamentation.

The herein described device comprises a minimum number of parts that are relatively cheap to manufacture and provides for the formation of ornamented butter chips in large quantities with a minimum amount of time and effort, thereby adapting itself for use by hotels and restaurants. It is to be understood that the ornamenting head may be formed with various letters and characterizations significant of the user.

Referring to the drawings for a more detailed description thereof, and particularly to Figures 1 to 4 inclusive, it will be noted that there is provided an upper frame 10 and a lower frame 11 each of which is substantially rectangular-shaped, with the frame 11 being slidably received within the frame 10. The bottom edge of the frame 11 is flared outwardly as indicated at 12 to form a supporting surface. The interior 13 of the frame 11 is hollow, being surrounded by side walls 14 and end walls 15 united by a flat upper surface 16. The frame 10 comprises side walls 17 and end walls 18, the upper edge of said walls 17 and 18 being formed with a flange 19. The frame 10 forms with the upper portion of the frame 11 a receiving chamber B for a print of butter generally designated at 20, the butter being of a form and size to fit within the upper frame 10 and rest upon the flat supporting surface 16.

The impresser head indicated generally by the reference numeral 21 is of substantially the same shape as the frame 10 and is of a size to fit over the flanges 19 of said frame, as clearly shown in Figures 1 and 2 of the drawings. The inner surface of the impresser head is formed with the ornamenting means 22 and is also provided with integrally formed extending cutting members 23 for dividing the print of butter into a number of equal sized chips. As more clearly shown in Figure 3 of the drawings, the cutting members 23 extend longitudinally and transversely of the head 21, which is also provided with an outer blade 23', which will be hereinafter termed a perimeter blade, adapted to confine the butter within the chamber and to prevent overflow thereof when pressure is applied to said head for ornamenting purposes. This will be readily apparent from an inspection of Figures 1 and 2 of the drawings, wherein it will be noted that the perimeter blade 23' has contactual relation with the inner surface of the walls of the outer frame 10. Thus as pressure is applied to the head the butter will be prevented from being displaced over the flange 19. In other words, the cutting members 23 score or cut apart the butter in such a manner that it can be readily separated along the scored lines after removal from the butter chamber, or while remaining in the chamber. The sectioning of the print of butter and ornamenting thereon are clearly illustrated at 24 and 25, respectively, in Figure 4 of the drawings. The impresser head 21 forms a closure member for the frame 10 and is provided with side members 26 attached by means 27 to the head plate 28 which slidably engage the flanges 19 for guiding the impresser head thereof, and in addition thereto, said side members provide a means of disengaging said impresser from the frame. To remove the impresser head from the frame 10, the lower edge of said head is engaged by the fingers of the hand and lifted upwardly, the space between the lower edge and the frame 10 being sufficient to accommodate the fingers of the user. As is to be understood, the side members 26 also serve as a supporting means for the impresser head when not in use and detached from the frame, thus protecting the ornamented inner surface 22 from injury. The space between the perimeter blade 23' and the side members 26 of the impresser head 21 is of a minimum width conforming to the size of the flange 19 but is of such proportions as to allow access for cleaning after use of the head.

As is to be understood, the ornamented chips or patties formed from the print of butter are of a predetermined size and thickness and it is essential that means be provided for assuring that the entire print of butter be consumed in a manner to form a multiplicity of equal sized chips or patties. It is also essential that the first and succeeding layers of butter chips be efficiently removed from the residue of butter remaining within the chamber. Means is provided for adjusting the size of the chamber by moving the frame 10 relative to the frame 11 so that the ornamented chips can be removed in successive operations to form a multiplicity of butter chips from the print of butter contained within the chamber. The adjusting means includes the formation of a series of angularly disposed communicating slots 29 on each end wall of the frame 11 and a second series of angularly disposed communicating slots 30 on each side wall of said frame. The end slots 29 are in alignment with each other and likewise the side wall slots 30 are in alignment with each other, as more clearly shown in Figures 1 and 2 of the drawings, the slots 30 being greater in number than the slots 29 for a purpose to be hereinafter described. The frame 10 is adjustably held relative to the frame 11 by means of a rod 31 extending through slots 32 formed in the end walls of the frame 10 with both ends thereof projecting beyond said frame or through slots 33 formed in the side walls of said frame. As shown in Figure 1 of the drawings, in the initial position the rod 31 extends through the slots 32 and the uppermost of the slots 29 and rests upon the extending shoulder 34. When in this position the entire print of butter may be accommodated within the chamber formed by the frames 10 and 11. The impresser head 21 is then disposed over the frame 10 and by exerting pressure downwardly thereon the top surface of the print of butter 20 will be ornamented and scored transversely and longitudinally to form the design shown in Figure 4 of the drawings. When the ornamenting and cutting members have penetrated the top surface of the butter, the top 28 of the head 21 will rest upon the flanges 19, as indicated in Figures 1 and 2 of the drawings. The impresser head 21 is then removed and the frame 10 dropped relative to the frame 11 by engaging each end of the rod 31 and moving it from the shoulder 34, whereby it will fall by gravity or pressure upon the succeeding shoulder 35, which causes the upper frame 10 to move downwardly a predetermined distance substantially equal to the depth of the scored lines 24 formed by the cutting members 23 on the ornamented surface of the butter projecting above the flange 19. By means of a chip removing device generally designated by the numeral 36 which cuts through the top surface of the butter, the ornamented and formed chips are removed. Removing the ornamented chips presents a new surface of butter for a second ornamenting operation by means of the impresser head, after removal of which, the rod 31 is disengaged from the shoulder 35 and drops upon the succeeding shoulder 37 and the ornamented chips are again removed in the manner indicated. By a series of successive operations the entire print of butter is ornamented in a manner to form a multiplicity of individually ornamented butter chips.

Should it be desired to increase the number of chips to be formed from a given quantity of butter, the slots formed in the side walls of the frames 10 and 11 are employed. As is to be understood, the rod 31 will be disposed between the slots 33 and in the initial operation will rest upon the shoulder 38 and is moved to the succeeding shoulders as the ornamenting operation is performed. It will be noted that a greater number of shoulder portions 38 are formed on the side wall slots 30 than are formed on the end wall slots 29, thus reducing the thickness of the individual chips or patties and increasing their number.

After the entire print of butter has been consumed, the frame 10 is returned to normal position by engaging the flanged edge thereof and urging the same upwardly. The rod 31 will follow the contour of the slots 29 and 30 without obstruction until engagement has been made with the topmost shoulder portion formed in said slots. The device is now ready for reuse.

It has been found in practice that special means must also be provided for assuring complete removal of the ornamented chips or patties from the print of butter within the frame. It is, therefore, a further feature of the present invention to provide a novel chip removing device especially adapted for use with the novel forming device. In Figure 4 of the drawings, the removing device 36 is illustrated as comprising parallel extending side members 39 adapted for engagement with the side flanges 19 with a raised front member 40 uniting said side members. A suitable handle 41 extends from an end member 42 coplanar with the side members 39. A series of wires 43 are attached to the side members 39 by any desired means and are arranged in parallel relation to form supports for the chips of butter 44 severed from the print of butter by the foremost wire 45 which is adapted to cut through the print of butter as the member 36 is moved transversely across the frame. As is to be understood, as soon as the member 36 has travelled across the frame the ornamented chips will be supported on the wires 43, and when said member is lifted from the frame, the chips are removed and may be deposited in a suitable receptacle. The flange 19 in cooperation with the side members 39 form the means of guiding the member 36 in its travel across the frame.

In the modified forms of the invention disclosed in Figures 5 and 6 of the drawings, it will be noted that the flanged portion of the upper frame has been modified to accommodate the use of a special form of butter chip removing device. It is also to be understood that the modified form of the invention contemplates the use of the slotted means for adjusting the relation of the top frame relative to the lower frame, the modification merely including altering the construction of the flange of the top frame. In Figures 5 and 6 of the drawings, the upper and lower frames are generally designated by the numerals 46 and 47, respectively, which combine to form a receiving chamber for a print of butter 48. The upper frame 46 is provided with extending flange portions 49 for cooperation with the impresser head in the manner described in the original form. The flanges extending along the side walls of the upper frame 46 are formed with longitudinal grooves 50 and spaced cut out portions 51 communicating therewith for cooperation with the chip remover 52. The side members 53 of the chip remover 52 are formed with spaced fins 54 engageable within the longitudinal grooves 50 for retaining and guiding the remover 52 as it is moved transversely across the frame 46. As in the preferred form, the remover 52 is formed with a plurality of parallel extending wires which form the supporting means for the chips of butter severed from the print with the foremost wire 55 serving as the cutting medium. After the member 52 has travelled entirely across the frame 48, the fins 54 will be aligned with the respective cut-out portions 51, whereby said remover may be lifted from the grooves of the frame carrying with it the severed ornamented chips. Thus it will be seen that an efficient and effective means has been provided for use in conjunction with the butter chip forming device to permit removal of the ornamented chips from the print of butter so that a multiplicity of butter chips can be successively formed and continuously removed from the same bulk down to the last layer of butter, which, of course, rests upon the base.

In Figure 7 of the drawings, there is illustrated a still further modified form of the invention in which a trackway 56 is formed along the top edge of the upper frame 57, which edge in the preferred form carried an extending flange. The trackway 56 cooperates with a channel-shaped portion 58 formed in spaced relation on the side members 59 of the chip remover 60. As in the other modified form, a space 61 is provided at predetermined spaced intervals of the trackway 56 whereby the remover 60 may be lifted from the frame after it has travelled across the frame 57. The channel-shaped members 58 are preferably formed integral with the side members 59 and are of a size to receive therebetween the trackway 56. In this form the butter is impressed and the chips successively removed by a continuous operation in the manner previously described.

From the above description taken in connection with the accompanying drawings, it is believed that the use and operation of the device is readily obvious. The upper and lower frames are to be manufactured to accommodate bulk or print butter of various weights. The form illustrated in the drawings is of a size for use with a one-pound print of butter which will rest upon the flat surface 16, and be completely enclosed by the top frame when said frame is in its initial position. The top surface is then ornamented and cut by the impresser head, after removal of which the top frame is dropped by the novel means described to permit removal of the ornamented chips from the print. By successive operations the entire print of butter is ornamented in an expeditious and efficient manner.

The upper and lower frames may be formed of any desired material, such as aluminum, metal or plastic substance and the slots formed in the side and end walls of the lower frame may be proportioned to obtain the minimum and maximum number of chips from a print of butter.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A device of the character described comprising, a frame, a second frame slidably engaging the walls of the first frame, said second frame forming with an upper portion of the first frame a receiving chamber for a print of butter, means extending through said frames for adjustably supporting said frames in varying position relative to each other to vary the size of the receiving chamber, means associated with one of said frames for cutting a layer of butter from said print, and cooperating means on the cutting means for facilitating removal of a layer of butter from said print.

2. A device of the character described comprising, a frame, a second frame slidably engaging the walls of the first frame, said second frame forming with an upper portion of the first frame a receiving chamber for a print of butter, a grooved flange formed in the upper end of said second frame, and means slidably engaging said grooved portion for removing strips of butter from said receiving chamber.

3. A device of the character described comprising, a frame, a second frame slidably engaging the walls of said first frame, said second frame forming with an upper portion of the first frame a receiving chamber for a print of butter, means for ornamenting and cutting the upper portion of said print of butter, and means associated with one of said frames for removing said ornamented and cut portion.

4. A device of the character described comprising, a frame, a second frame slidably engaging the walls of the first frame, said second frame forming with an upper portion of the first frame a receiving chamber for a print of butter, means slidably mounted externally of said second frame for ornamenting and cutting the upper surface of said print of butter, and means associated with said second frame for removing a portion of said print, said means including a grooved flange formed on the upper edge of said frame, a cutting member slidable within said grooves and movable transversely therein whereby movement within said grooves severs a layer of the butter including the ornamented surface thereof and supports the same for removal from said print.

5. A device of the character described comprising, a frame, a second frame slidably engaging the walls of the first frame, said second frame forming with an upper portion of the first frame a receiving chamber for a print of butter, means slidably mounted externally of said second frame for ornamenting and cutting the upper surface of said print of butter, and means associated with said second frame for removing a portion of said print, said means including a trackway formed on the upper edge of said frame, a cutting member slidable on said trackway and movable transversely thereon whereby movement thereof severs a layer of the butter including the ornamented surface thereof and supports the same for removal from said print.

6. A process of forming patties of butter from a print of butter supported within a variable chamber, comprising the step of impressing said print to produce an ornamentation on one surface thereof and simultaneously forming longitudinal and transverse cuts across said print, varying the chamber to expose and project the ornamented surface above the same, cutting completely through said print parallel to said ornamented surface to form a slab of patties and simultaneously support the same, removing said patties so ornamented and repeating said operation on said print to thereby form in successive operations a multiplicity of similar patties from a single print of butter.

7. In combination with a container for receiving a print of butter having an open upper end and a flanged edge adjacent the opening, a cutting implement comprising a substantially rectangular-shaped frame, a cutting member extending transversely of said frame, means carried by said frame disposed in the rear of said cutting member for supporting the substance severed by said cutting member, and guide means cooperating with the flanged edge for permitting longitudinal movement thereof through said print.

8. In combination with a container for receiving a print of butter having an open upper end and a flanged edge adjacent the opening, a cutting implement comprising a substantially rectangular-shaped frame having parallel extending side members, a cutting member extending transversely of said side members, means carried by said side members disposed in a plane with said cutting member and in the rear thereof for supporting the substance severed by said cutting member, and guide means carried by said frame cooperating with the flanged edge for permitting longitudinal movement thereof through said print.

9. In combination with a container for receiving a print of butter having an open upper end and a grooved flanged edge adjacent the opening, a cutting implement comprising a substantially rectangular-shaped frame, a cutting member extending transversely of said frame, means carried by said frame disposed in the rear of said cutting member for supporting the substance severed by said cutting member, and means carried by said frame and cooperating with the grooved flanged edge for permitting longitudinal movement thereof through said print.

10. A device of the character described comprising, a frame, a second frame slidably engaging the walls of the first frame, said second frame forming with an upper portion of the first frame a receiving chamber, said first frame having one or more sets of openings formed in the side walls thereof, each set comprising a series of staggered slots providing facing projections and recesses, each projection entering part way into a recess and the recesses and projections providing free path of movement from one end of each series to the other end thereof, and a rod-like member carried by said second frame and adapted to be retained on any of the projections, said rod-like member adapted to be moved to various projections to vary the size of the receiving chamber.

11. A device of the type described comprising, a first member, a second member slidably related to said first member and cooperating therewith to provide a receiving chamber for a plastic material to be moulded, said second member being slidable relative to said first member to vary the size of the receiving chamber, one of said members being provided with shoulders and opposed recesses, pin means movably associated with the other of said frame members and adapted for selective engagement with said shoulders for latching the two members in successive chamber forming positions, and cam faces formed on said shoulders to cause movement of said pin means from said shoulders to said recesses as said second member is returned to its initial moulding position.

12. A process of forming patties from a quantity of butter retained within a variable chamber, comprising, the step of impressing said butter to produce an ornamentation on one surface thereof and simultaneously forming longitudinal and transverse cuts across said butter, varying the chamber to expose and project the ornamented surface beyond the same, and thereafter cutting completely through said butter parallel to said ornamented surface to form a slab of patties and simultaneously supporting the same, removing said patties so ornamented, and repeating said operation on said butter to thereby form in successive operations a multiplicity of similar patties from said butter.

MAURICE J. WEINBERG.